United States Patent
Amarilio et al.

(10) Patent No.: US 11,064,295 B2
(45) Date of Patent: Jul. 13, 2021

(54) SCRAMBLING DATA-PORT AUDIO IN SOUNDWIRE SYSTEMS

(71) Applicant: QUALCOMM Incorporated, San Diego, CA (US)

(72) Inventors: Lior Amarilio, Yokneam (IL); Yiftach Benjamini, Givat Ela (IL); Sharon Graif, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/597,902

(22) Filed: Oct. 10, 2019

(65) Prior Publication Data

US 2020/0120421 A1  Apr. 16, 2020

Related U.S. Application Data

(60) Provisional application No. 62/745,534, filed on Oct. 15, 2018.

(51) Int. Cl.
| | |
|---|---|
| *H04R 3/00* | (2006.01) |
| *G06F 3/16* | (2006.01) |
| *H04R 3/04* | (2006.01) |
| *G10L 21/0208* | (2013.01) |

(Continued)

(52) U.S. Cl.
CPC .............. *H04R 3/04* (2013.01); *G06F 3/16* (2013.01); *G06F 3/162* (2013.01); *G06F 9/30134* (2013.01); *G10L 21/0208* (2013.01); *H04L 65/601* (2013.01); *H04L 65/80* (2013.01)

(58) Field of Classification Search
CPC . H04R 3/00; H04R 3/005; H04R 3/04; H04R 3/12; H04R 3/14; G06F 6/16; G06F 6/162; G06F 9/30; G06F 9/3012; G06F 9/3098; G06F 9/30134; G06F 13/42;
(Continued)

(56) References Cited

U.S. PATENT DOCUMENTS

| | | | | |
|---|---|---|---|---|
| 5,802,187 | A | * 9/1998 | Hsu | ........................ G10K 15/02 |
| | | | | 327/172 |
| 7,388,958 | B1 | * 6/2008 | Maier | .................. H04L 63/0485 |
| | | | | 380/270 |
| 8,949,493 | B1 | 2/2015 | Wortman et al. | |

(Continued)

FOREIGN PATENT DOCUMENTS

GB   2265069 A   9/1993

OTHER PUBLICATIONS

MIPI Alliance, "Specification for SoundWire," Version 1.0, Jan. 21, 2015, MIPI Alliance, Inc., 289 pages.

(Continued)

*Primary Examiner* — Thang V Tran (57) ABSTRACT

Systems and methods for scrambling data-port audio in SOUNDWIRE™ systems include a scramble enable feature that allows a data source to scramble an outgoing channel content with a cyclic linear feedback shift register (LFSR) using a pseudo-random binary sequence (PRBS) such as, but not limited to, the PRBS defined in the SOUNDWIRE specification. Data ports for audio sinks receiving the scrambled content descramble the content for use by the audio sink. In a specific exemplary aspect, an output of the LFSR is added or subtracted with the audio data to make the microphones independent of one another and reduce crosstalk.

5 Claims, 11 Drawing Sheets

(51) Int. Cl.
*H04L 29/06* (2006.01)
*G06F 9/30* (2018.01)

(58) Field of Classification Search
CPC . G06F 13/4221; G06F 13/4204; G10L 21/02; G10L 21/0208; H04L 65/80; H04L 65/601
See application file for complete search history.

(56) References Cited

U.S. PATENT DOCUMENTS

| | | | |
|---|---|---|---|
| 9,231,530 B1* | 1/2016 | Kaushik | H04B 17/13 |
| 9,729,360 B2* | 8/2017 | Anthapadmanabhan | H04L 1/0071 |
| 2010/0153699 A1* | 6/2010 | Falconer | G06F 7/584 713/2 |
| 2010/0316216 A1* | 12/2010 | Fukushima | H04L 9/12 380/42 |
| 2013/0195218 A1 | 8/2013 | Whitby-Strevens | |
| 2014/0126919 A1* | 5/2014 | Anthapadmanabhan | H04L 1/0071 398/202 |
| 2014/0269954 A1 | 9/2014 | Whitby-Strevens | |
| 2017/0117979 A1 | 4/2017 | Sengoku et al. | |
| 2019/0287549 A1* | 9/2019 | Poulsen | G06F 3/162 |
| 2019/0296763 A1* | 9/2019 | Nakamoto | H03M 3/416 |

OTHER PUBLICATIONS

International Search Report and Written Opinion for PCT/US2019/055841, dated Dec. 9, 2019, 15 pages.

* cited by examiner

TABLE 105 PRBS TEST PATTERN GENERATION

| PRBS TEST DATA PATTERN<br>(BINARY NUMBER, MSB FIRST) | NOTES (INFORMATIVE)<br>(EQUIVALENT TO THE LEADING 255 BITS OF THIS HEX NUMBER, MSB FIRST) |
|---|---|
| 1100 1000 1000 1101 1011 1000 1011 0011<br>0010 1101 1001 0011 1010 1010 1110 1101<br>0110 1001 1111 1110 0110 1111 0111 0100<br>0000 0101 0110 0011 0011 1000 0001 1111<br>0100 1010 1000 1001 0100 0011 1011 1111<br>0110 0001 1000 1011 1000 0001 0100 0101<br>0011 0101 0000 0111 1001 1110 1011 1110<br>0011 1001 0100 0111 1000 0100 1001 011. | 0xC88DB8B3<br>2D93AAED<br>69FE6F74<br>0563381F<br>4A9043BF<br>61898345<br>350B9EBE<br>39478496 |

SCRAMBLING DATA-PORT AUDIO IN SOUNDWIRE SYSTEMS

PRIORITY CLAIM

The present application claims priority to U.S. Provisional Patent Application Ser. No. 62/745,534 filed on Oct. 15, 2018 and entitled "SCRAMBLING DATA-PORT AUDIO IN SOUNDWIRE SYSTEMS," the contents of which is incorporated herein by reference in its entirety.

BACKGROUND

I. Field of the Disclosure

The technology of the disclosure relates generally to audio systems and particularly for controlling noise for SOUNDWIRE audio systems.

II. Background

Mobile communication devices have become increasingly common in current society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

The mobile communication devices commonly include at least one microphone and multiple speakers. The microphone and the speakers used in the mobile communication devices typically have analog interfaces which require a dedicated two-wire connection between each pair of devices. Since a mobile communication device is capable of supporting multiple audio devices, it may be desired to allow a microprocessor or other control device in the mobile communication device to communicate audio data to multiple audio devices over a common communication bus simultaneously.

In this regard, the MIPI® Alliance initially developed the Serial Low-power Inter-chip Media Bus (SLIMbus$^{SM}$ or SLIMBUS) to handle audio signals within a mobile communication device. The first release was published in October 2005 with v1.01 released on Dec. 3, 2008. In response to industry feedback, MIPI has also developed SoundWire$^{SM}$ (SOUNDWIRE), a communication protocol for a processor in the mobile communication device (the "master") to control distribution of digital audio streams between one or more audio devices (the "slave(s)") via one or more SOUNDWIRE slave data ports. Version 1.1 was released Jun. 27, 2016.

Many mobile communication devices that use SOUNDWIRE audio buses incorporate multiple microphones that are attached to the SOUNDWIRE audio bus. Even when the microphones are acoustically isolated from one another, the microphones may experience crosstalk. In particular, when a first microphone toggles a bit on a bus and thus drives current on the bus, that current may cause a minor current on an input/output pad on a second microphone, which may create heat in the cavity of the second microphone. This heat changes the operating condition of the sound capturing membrane of the second microphone. Current models indicate that this thermal change creates a low-pass filter for the second microphone allowing low frequency signals from the first microphone to be modulated into signals from the second microphone. Such crosstalk, or crosstalk caused by other sources, may cause the resulting audio signal to be affected sufficiently to be detectable by the human ear and thus may negatively impact the audio experience. Accordingly, there is a need to mitigate this crosstalk.

SUMMARY OF THE DISCLOSURE

Aspects disclosed in the detailed description include systems and methods for scrambling data-port audio in SOUNDWIRE™ systems. In an exemplary aspect, a scramble enable feature allows a data source to scramble an outgoing channel content with a cyclic linear feedback shift register (LFSR) using a pseudo-random binary sequence (PRBS), such as, but not limited to, the PRBS defined in the SOUNDWIRE specification. Data ports for audio sinks receiving the scrambled content descramble the content for use by the audio sink. In a specific exemplary aspect, an output of the LFSR is added or subtracted with the audio data to make the microphones independent of one another and reduce crosstalk. In a system where there is more than one microphone or a microphone with more than one port, a different offset of the output of the LFSR may be used for each port.

In this regard in one aspect, a method for reducing crosstalk in an audio system is disclosed. The method includes, at an audio source associated with an audio bus, enabling an output signal from a LFSR based on an enable signal. The output signal includes an offset output of a PRBS. The method also includes scrambling a data stream with the output signal of the LFSR to produce a scrambled stream of data. The method also includes providing the scrambled stream of data to the audio bus.

In another aspect, a method for reducing crosstalk in an audio system is disclosed. The method includes, at an audio sink associated with an audio bus, enabling an output signal from a LFSR based on an enable signal. The output signal includes an offset output of a PRBS. The method also includes descrambling an incoming data stream from the audio bus with the output signal of the LFSR to produce a descrambled stream of data. The method also includes outputting the descrambled stream of data.

In another aspect, an audio source is disclosed. The audio source includes an audio bus interface including a first data port coupled to an audio bus. The audio source also includes a control system coupled to the audio bus interface. The first data port includes a first LFSR. The first data port also includes a first offset circuit coupled to the first LFSR configured to provide a first offset signal to the first LFSR. The first data port also includes a first exclusive OR (XOR) circuit coupled to the first LFSR to scramble a stream of data to be provided to the audio bus.

In another aspect, an audio system is disclosed. The audio system includes an audio bus, and audio sink coupled to the audio bus, and an audio source. The audio source includes an audio bus interface including a first data port coupled to the audio bus. The audio source also includes a control system coupled to the audio bus interface. The first data port includes a first LFSR. The first data port also includes a first offset circuit coupled to the first LFSR configured to provide a first offset signal to the first LFSR. The first data port also includes a first XOR circuit coupled to the first LFSR to scramble a stream of data to be provided to the audio bus.

In another aspect, an audio sink is disclosed. The audio sink includes an audio bus interface including a physical layer (PHY) coupled to an audio bus. The audio sink also includes a control system coupled to the audio bus interface.

The PHY includes a LFSR coupled to an XOR circuit to descramble an incoming stream of data received from the audio bus.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for scrambling data-port audio in SOUNDWIRE™ systems. In an exemplary aspect, a scramble enable feature allows a data source to scramble an outgoing channel content with a cyclic linear feedback shift register (LFSR) using a pseudo-random binary sequence (PRBS) such as, but not limited to, the PRBS defined in the SOUNDWIRE specification. Data ports for audio sinks receiving the scrambled content descramble the content for use by the audio sink. In a specific exemplary aspect, an output of the LFSR is added or subtracted with the audio data to make the microphones independent of one another and reduce crosstalk. In a system where there is more than one microphone or a microphone with more than one port, a different offset of the output of the LFSR may be used for each port.

Exemplary aspects of the present disclosure are well-suited for use in both SOUNDWIRE and SOUNDWIRE NEXT audio systems. A SOUNDWIRE audio system is discussed with reference to FIG. 1 while master and slave devices are discussed with reference to FIGS. 2 and 3, respectively. A mixed SOUNDWIRE/SOUNDWIRE NEXT audio system is discussed with reference to FIG. 4. The audio sinks and audio sources within each system may include exemplary aspects of the present disclosure. A discussion of particular details of the present disclosure begins below with reference to FIG. 5.

Figure 1:
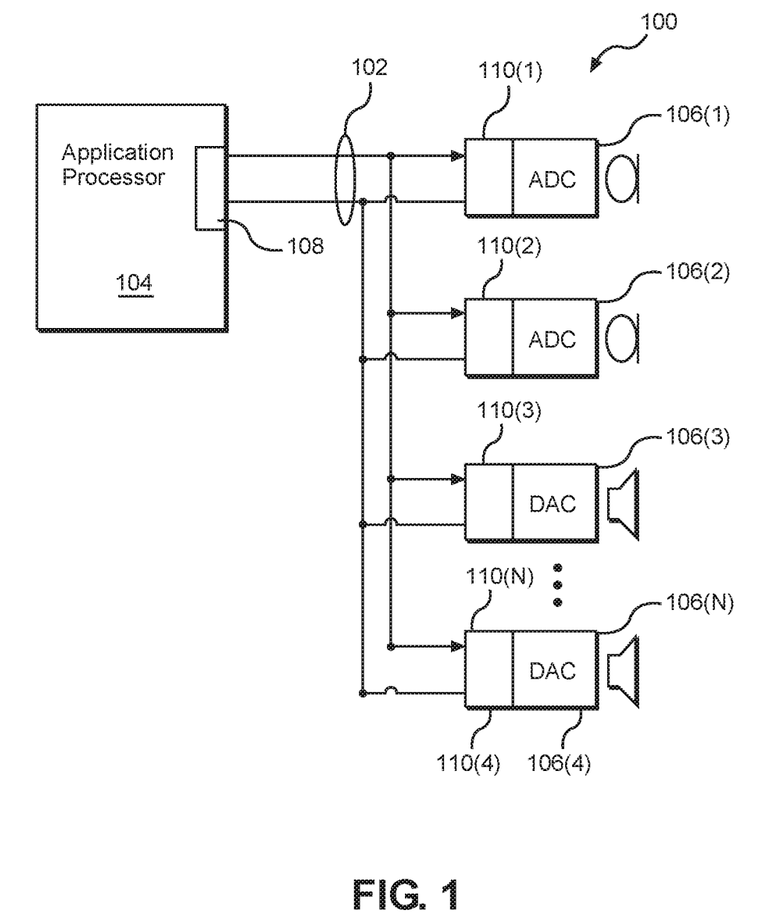
FIG. 1 is a block diagram of an exemplary SOUNDWIRE audio system.

In this regard, FIG. 1 is a block diagram of an audio system 100 having a multi-drop differential audio bus 102. In particular, the bus 102 couples a master device 104 such as an audio codec or application processor to one or more slave devices 106(1)-106(N). For the purposes of illustration, N is four herein. The slave devices 106(1) and 106(2) may be microphones and include analog-to-digital converters (ADCs) while the slave devices 106(3) and 106(4) may be speakers and include digital-to-analog converters (DACs). The master device 104 includes an interface (historically called a downstream-facing interface (DFI), although this term is currently out of favor, this term may be used by some authors) 108, while the slave devices 106(1)-106(N) include respective interfaces (historically called upstream-facing interfaces (UFIs) although again, this term is currently out of favor) 110(1)-110(N). While any multi-drop differential audio bus may use aspects of the present disclosure, exemplary aspects specifically contemplate a SOUNDWIRE or SOUNDWIRE NEXT multi-drop differential audio bus.

Figure 2:
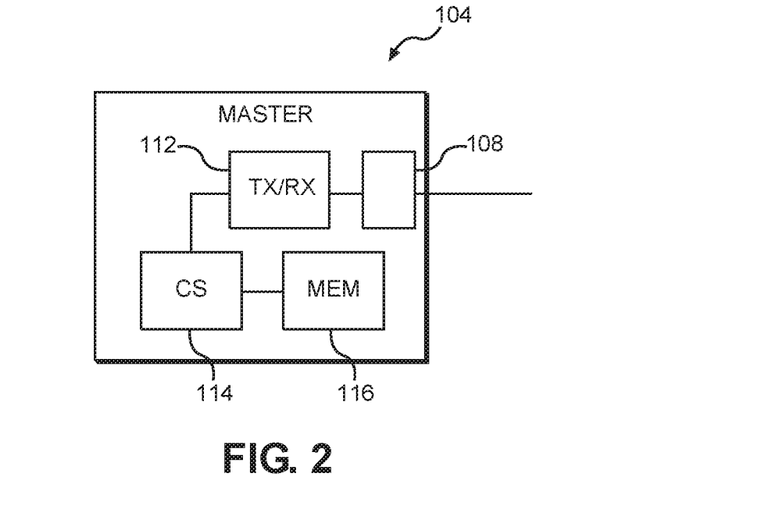
FIG. 2 is a block diagram of a master device that may be associated with the SOUNDWIRE audio system of FIG. 1.
Figure 3:
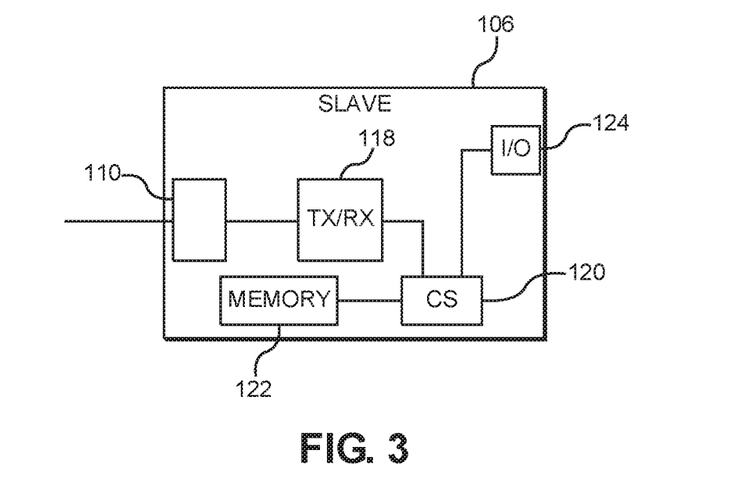
FIG. 3 is a block diagram of a slave device that may be associated with the SOUNDWIRE audio system of FIG. 1.

As better illustrated in FIG. 2, the master device 104 may include the interface 108, which may be a physical layer (PHY) including one or more transistors and/or a bus keeper circuit (not illustrated) that control signal levels on the bus 102. Further, the master device 104 may include a transceiver 112 coupled to the interface 108 and a control system (CS) 114. The control system 114 may be hardware based and/or operate software including drivers or the like and may interoperate with a memory (MEM) 116 which may include one or more registers. Similarly, a slave device 106 is illustrated in FIG. 3 and may include an interface 110, which may be a PHY including one or more transistors (not illustrated) that control signal levels on the bus 102. Further, the slave device 106 may include a transceiver 118 coupled to the interface 110 and a control system (CS) 120. The control system 120 controls the transport response and access to a memory 122. The control system 120 may further control an input/output (I/O) device 124 (e.g., a microphone or speaker).

In an exemplary aspect, the slave devices 106(1) and 106(2) may act as audio sources in that an audio signal originates therefrom. Likewise, the slave devices 106(3) and 106(4) may act as audio sinks in that audio signals are sent thereto. The master device 104 may, relative to the slave devices 106(1) and 106(2) may be an audio sink, but may be an audio source relative to the slave devices 106(3) and 106(4). That is, a particular port within the master device 104 may be functioning as an audio source or audio sink depending on the nature of the link for the port.

Figure 4:
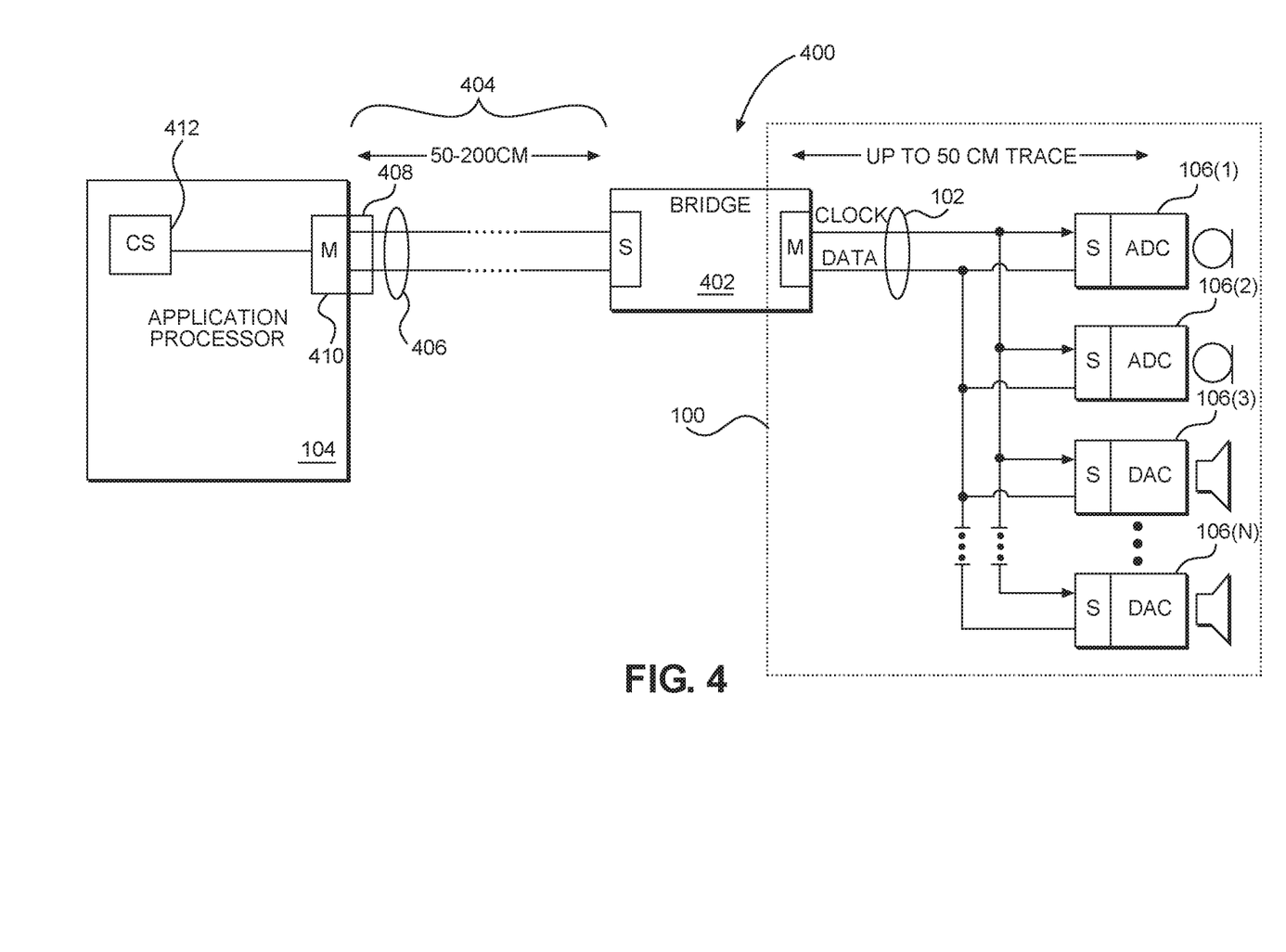
FIG. 4 is a block diagram of an exemplary mixed SOUNDWIRE and SOUNDWIRE NEXT audio system.

While the audio system 100 conforms in appearance to a SOUNDWIRE system, it should be appreciated that exemplary aspects of the present disclosure also are applicable to SOUNDWIRE NEXT systems. SOUNDWIRE NEXT was initially referred to as SOUNDWIRE-XL and may be renamed in future iterations. As of this writing, the latest published version is SOUNDWIRE-XL version 0.2-r01, with a new version expected shortly after this writing. In this regard, FIG. 4 is a block diagram of an exemplary expanded SOUNDWIRE system 400 with a bridge 402 and a SOUNDWIRE NEXT segment 404 formed between an application processor 104 and the bridge 402 by a SOUNDWIRE NEXT cable 406. The SOUNDWIRE NEXT cable 406 is a two-wire cable configured to carry a differential signal thereover. The application processor 104 is a master device relative to the bridge 402. While described as an application processor 104, it should be appreciated that the master device may instead be a codec or other element as is well understood. The application processor 104 may be in a device such as a mobile computing device (not shown) that includes a receptacle 408 configured to receive a SOUNDWIRE NEXT cable such as the SOUNDWIRE NEXT cable 406. The SOUNDWIRE NEXT cable 406 may be up to two meters (2 m or 200 centimeters (cm)) long. The receptacle 408 may be operatively associated with an interface 410 (which may or may not be in the application processor 104) that includes appropriate electrical contacts to convey a differential data signal with an embedded clock signal to the two wires of the SOUNDWIRE NEXT cable 406. The interface 410 may further be operatively coupled to a control system (labeled CS in the Figures) 412. The function of the control system 412 is explored in greater detail below.

With continued reference to FIG. 4, the bridge 402 is configured to operate as a slave device relative to the application processor 104, and translate SOUNDWIRE NEXT signals to SOUNDWIRE signals for use on a SOUNDWIRE system 100. In the SOUNDWIRE system 100, the bridge 402 acts as a master device and is configured to send and receive signals to slave devices 106(1)-106(N) through a SOUNDWIRE bus 102. While FIG. 4 illustrates one bridge arrangement, a reversed bridge changing from SOUNDWIRE to SOUNDWIRE NEXT may allow legacy SOUNDWIRE master devices to couple to slaves at a greater distance (e.g., a legacy application processor coupling to devices in a headset through a cable more than 50 cm long).

Note further, SOUNDWIRE NEXT currently supports a multi-drop arrangement and would look similar to the SOUNDWIRE system 100 of FIG. 1. Likewise, the block diagrams of the master device 104 and the slave device 106 of FIGS. 2 and 3 would also generically apply to masters and slaves in a SOUNDWIRE NEXT system.

Figure 5:
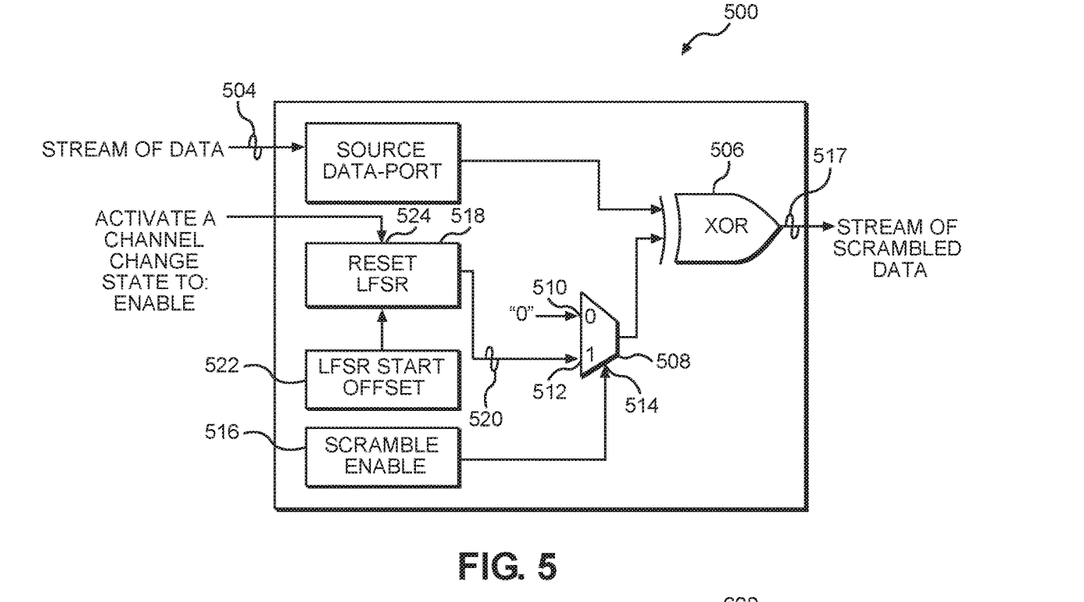
FIG. 5 is a simplified block diagram of a data port for an audio source in an audio system showing a scrambling capability according to an exemplary aspect of the present disclosure.

To provide the scrambling and descrambling functionality of the present disclosure, the data ports of the audio sources and audio sink are modified from conventional structures through the addition of certain elements within the respective data ports. In this regard, FIG. 5 illustrates a source data port 500 associated with an audio source (e.g., the slave device 106(1), which is a microphone). The source data port 500 receives an outgoing stream of data 504, which is provided to an exclusive OR (XOR) circuit 506. The XOR circuit 506 is also coupled to a multiplexer 508. The multiplexer 508 selects between a zero input 510 and a one input 512 as enabled by an enable input 514 from a scramble enable register 516. Thus, the XOR circuit 506 outputs a scrambled stream of data 517. Additionally, a LFSR 518 may provide a signal 520 to the one input 512 of the multiplexer 508. An offset may be provided to the LFSR 518 through an offset circuit 522. The offset selects which value of the LFSR 518 is provided in the signal 520. In an exemplary aspect, the LFSR 518 is based on a PRBS defined by the SOUNDWIRE specification. That is, the LFSR 518 reuses a value already present in the source data port 500. The LFSR 518 includes a reset input 524, which, when a channel is activated, enables use of the LFSR 518 to output the signal 520.

Figure 6:
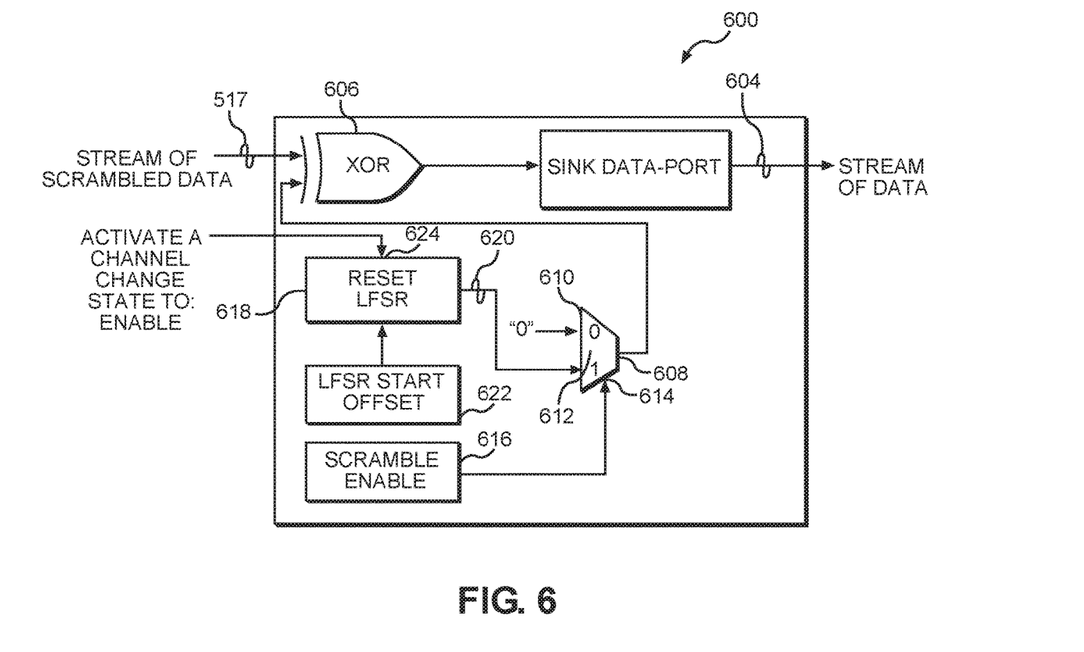
FIG. 6 is a simplified block diagram of a data port for an audio sink in an audio system showing a descrambling capability according to an exemplary aspect of the present disclosure.

Similarly, FIG. 6 illustrates a sink data port 600 associated with an audio sink (e.g., the master device 104 or the slave device 106(3), which is a speaker). The sink data port 600 provides an incoming stream of data 604, which is provided from an XOR circuit 606. The XOR circuit 606 receives inputs from a stream of scrambled data, which may be the scrambled stream of data 517 of FIG. 5. The XOR circuit 606 also receives an input from a multiplexer 608. The multiplexer 608 selects between a zero input 610 and a one input 612 as enabled by an enable input 614 from a scramble enable register 616. Additionally, a LFSR 618 may provide a signal 620 to the one input 612 of the multiplexer 608. An offset may be provided to the LFSR 618 through an offset circuit 622. The offset selects which value of the LFSR 618 is provided in the signal 620. In an exemplary aspect, the LFSR 618 is based on a PRBS defined by the SOUNDWIRE specification. That is, the LFSR 618 reuses a value already present in the sink data port 600. The LFSR 618 includes a reset input 624, which, when a channel is activated, enables use of the LFSR 618 to output the signal 620. The LFSR 618 will be programmed to match the LFSR 518 such that the scrambling added in the source data port 500 of the audio source is descrambled at the sink data port 600 of the audio sink. This scrambling will make the audio sources independent of one another such that the current induced crosstalk will be mitigated or eliminated.

Figure 7A:
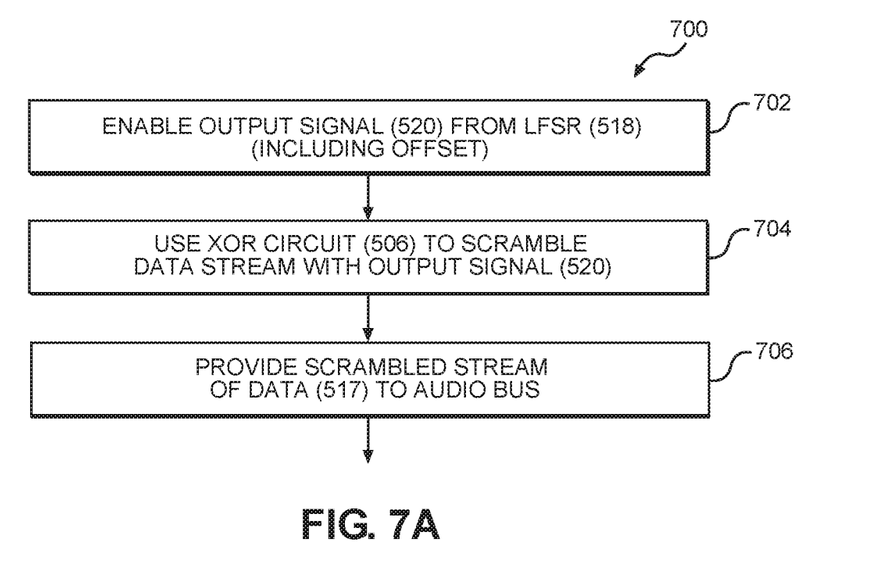
FIG. 7A is a flowchart illustrating an exemplary process for scrambling data at an audio data port for an audio source.
Figure 7B:
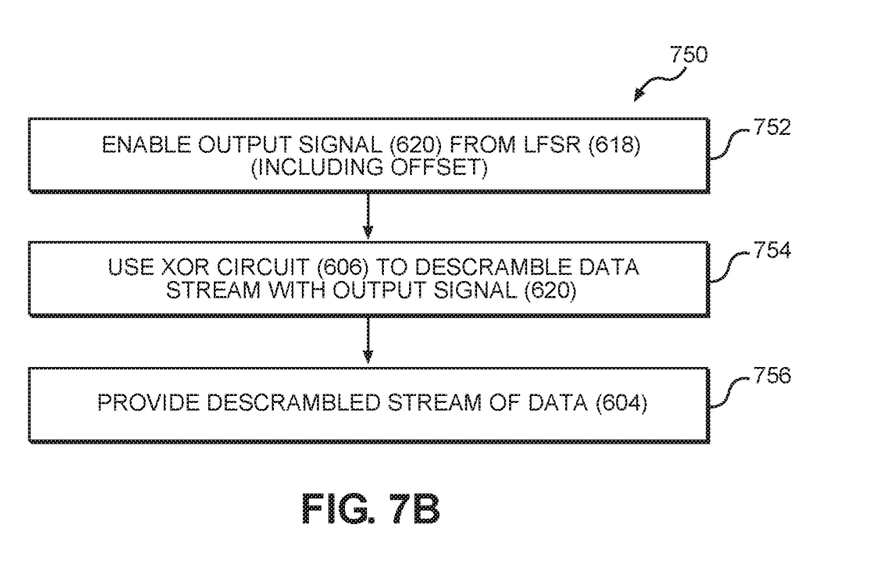
FIG. 7B is a flowchart illustrating an exemplary process for descrambling data at an audio data port for an audio sink.

Exemplary aspects of the present disclosure, use, for example, the hardware described in FIGS. 5 and 6 to provide corresponding methods 700 and 750 described with reference to FIGS. 7A and 7B, respectively. At the audio source, the method 700 enables the output signal 520 from the LFSR 518 (including any offset) (block 702) and then uses the XOR circuit 506 to scramble the data stream with the output signal 520 (block 704). The scrambled stream of data 517 is then provided to the audio bus (block 706). Similarly, at the audio sink, the method 750 enables the output signal 620 from the LFSR 618 (including any offset) (block 752) and uses the XOR circuit 606 to descramble the data stream with the output signal 620 (block 754). The descrambled stream of data 604 is then provided for use in the audio sink (block 756). It should be appreciated that there is an initial phase in which the LFSR value is synchronized across the ports. This synchronization occurs at a reset, which occurs following a successful bank-switch. Thus, while not illustrated, there is a reset of the LFSR just before the port is activated, such that the output of the LFSR is identical on both sides of the traffic.

Figure 10:
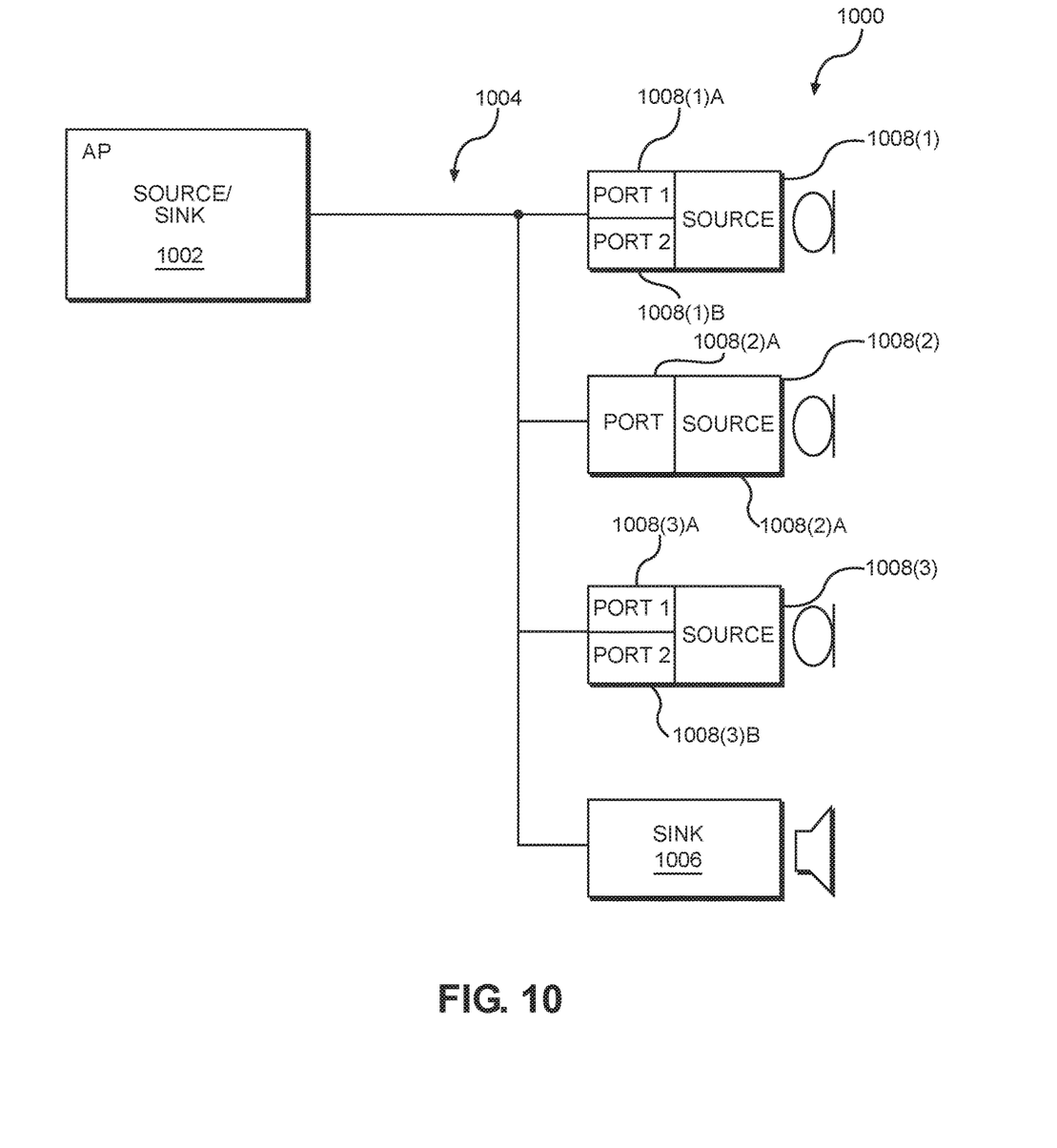
FIG. 10 is a simplified block diagram of an audio system with multiple microphone ports connected to an audio sink.
Figure 11:
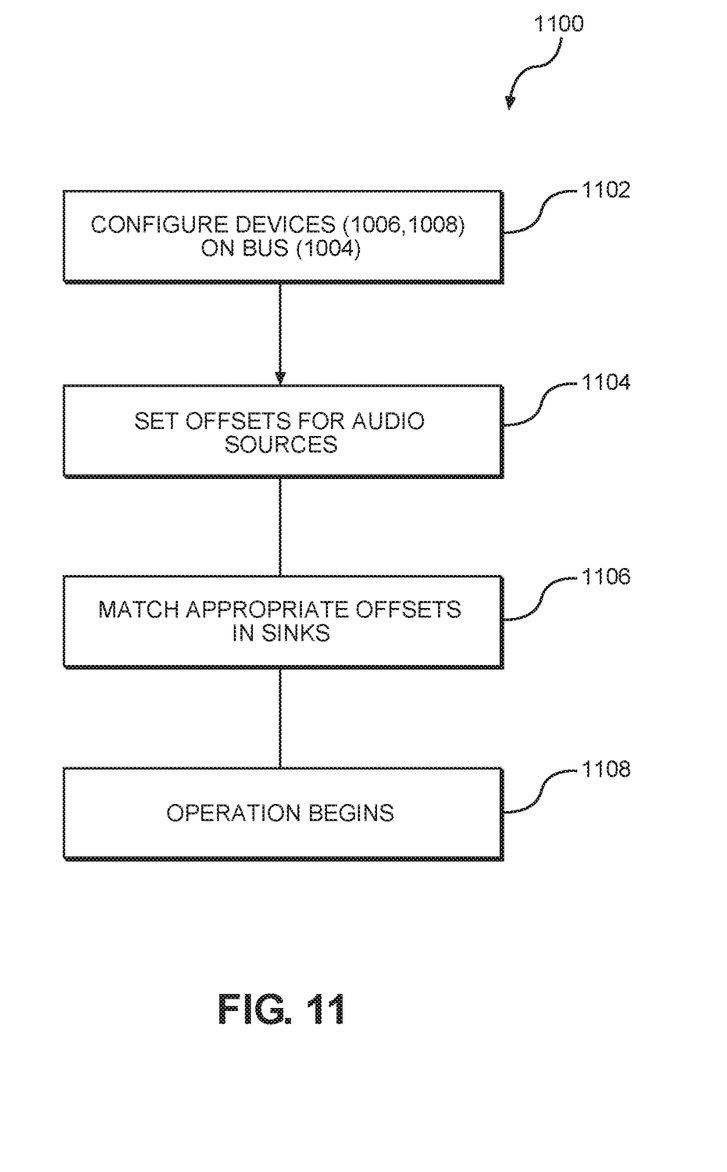
FIG. 11 is a flowchart illustrating configuration and offset assignment before enabling signals on an audio bus.

The description of FIGS. 5-7B generally focuses on devices (e.g., audio sources or audio sinks) having a single port. The present disclosure is also applicable to situations where an audio source has multiple ports or situations where there are multiple audio sources (e.g., multiple microphones). In this regard, FIG. 10 provides a simplified block diagram of a computing system 1000 that has multiple audio sources including at least one audio source having two ports. FIG. 11 provides a flowchart illustrating a configuration process where offsets are varied for different ports within a system having multiple ports.

With reference to FIG. 10, the computing system 1000 may include an application processor 1002 or other master device for an audio bus 1004, which may be a SOUNDWIRE, SOUNDWIRE NEXT, or comparable audio bus. The application processor 1002 may act as an audio source, providing audio to an audio sink such as a speaker 1006. The application processor 1002 may also act as an audio sink, receiving audio from one or more audio sources, such as microphones 1008(1)-1008(3). While microphone 1008(2) has a single port 1008(2)A, microphones 1008(1) and 1008(3) each have two ports (e.g., ports 1008(1)A, 1008(1)B and 1008(3)A, 1008(3)B, respectively). It should be appreciated that each of the ports 1008(1)A-1008(3)B may be a source data port 500 as illustrated in FIG. 5 with its own LFSR 518 which may provide respective signals 520 to the one input 512 of the respective multiplexer 508. Likewise, each port may include its own offset circuit 522. The offset circuit 522 selects which value of the LFSR 518 is provided in the signal 520. In an exemplary aspect, each port has a unique offset to help prevent potential crosstalk. That is, for example, the port 1008(1)A has a different offset than the port 1008(1)B which has a different offset than the port 1008(2)A which has a different offset than the port 1008(3)A which has a different offset the port 1008(3)A. To enable transport of an audio stream from an audio source to audio sinks, on the master side, every sink port which corresponds with one of the source ports has to be configured to use a same offset value as configured in the corresponding source.

The offsets are set to be different during configuration as better illustrated by the flowchart of process 1100 illustrated in FIG. 11. In this regard, the process 1100 begins at power start, power reset, or the like with the application processor 1002 (or other bus master) configuring the devices 1006, 1008 on the audio bus 1004 (block 1102). As part of the configuration, the application processor 1002 may set the offsets for the different ports of the audio sources (block 1104). The application processor 1002 may further match appropriate offsets in ports for the audio sinks (block 1106), and operation begins (block 1108) such as by beginning processes 700, 750.

The systems and methods for scrambling data-port audio in SOUNDWIRE systems according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 8A:
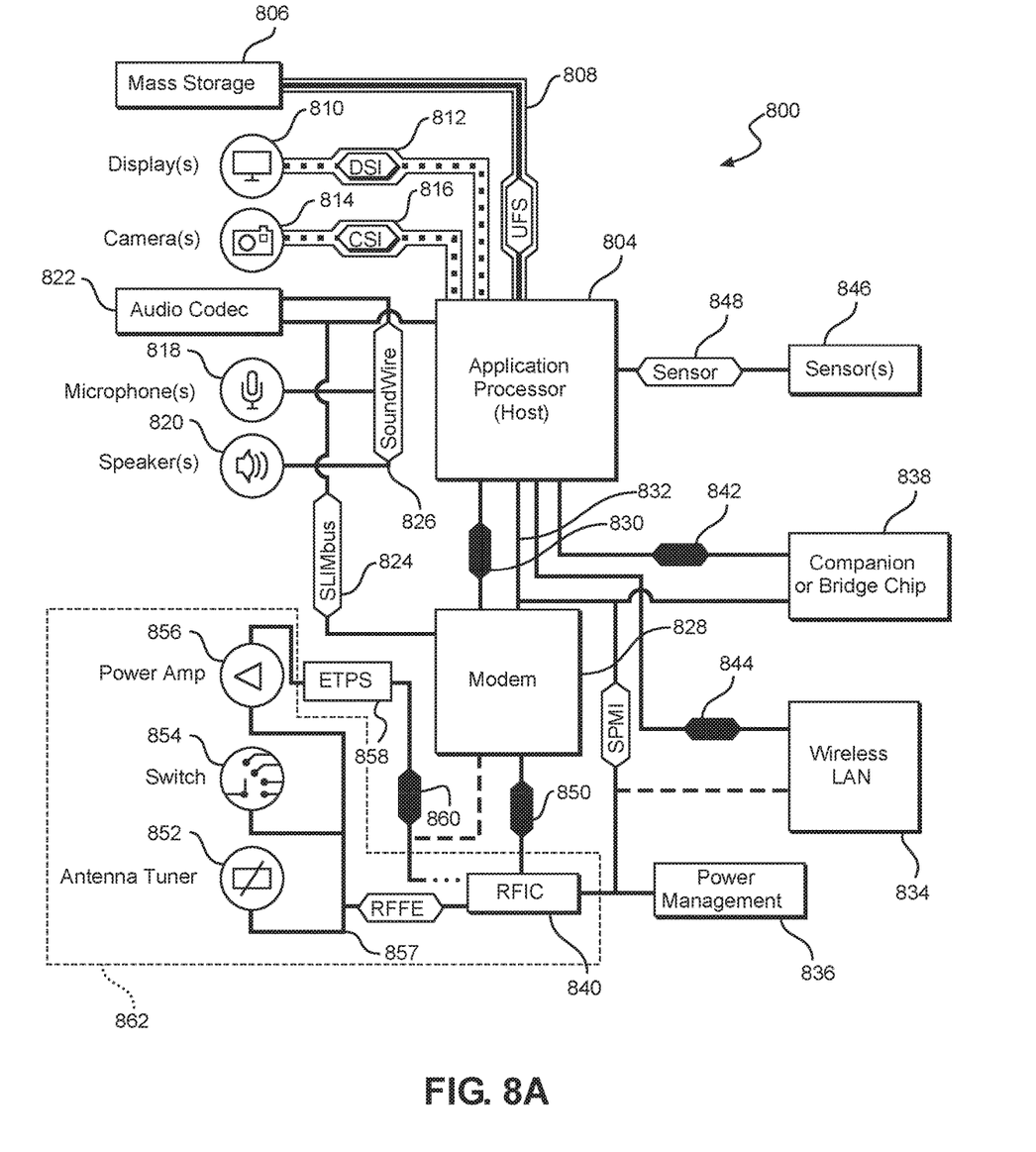
FIG. 8A is a system-level block diagram of an exemplary mobile terminal that can include the audio system of FIG. 1 or 4.
Figure 8B:
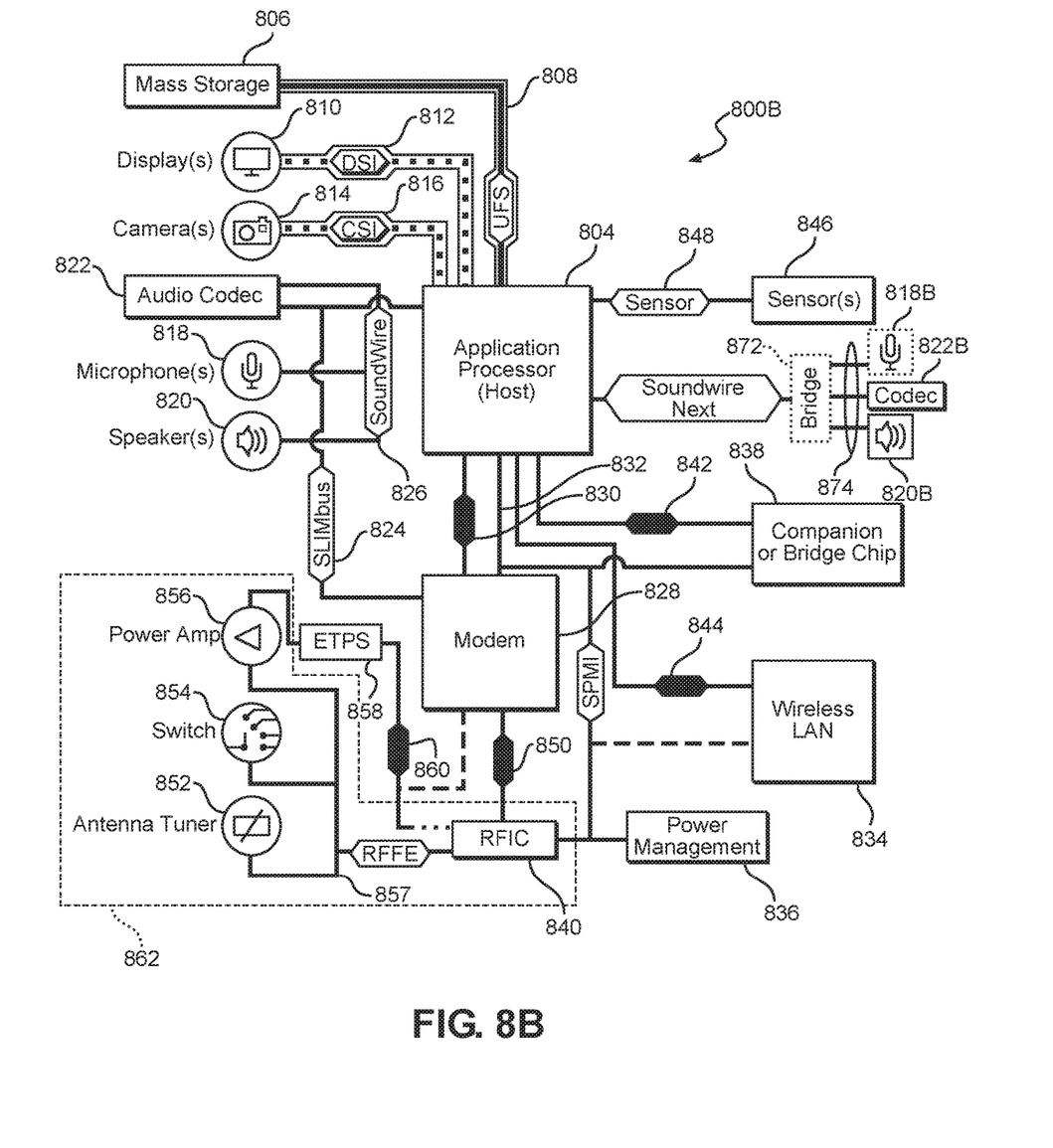
FIG. 8B is a system-level block diagram of an alternate exemplary mobile terminal that can include the audio system of FIG. 1 or 4.
Figure 8C:
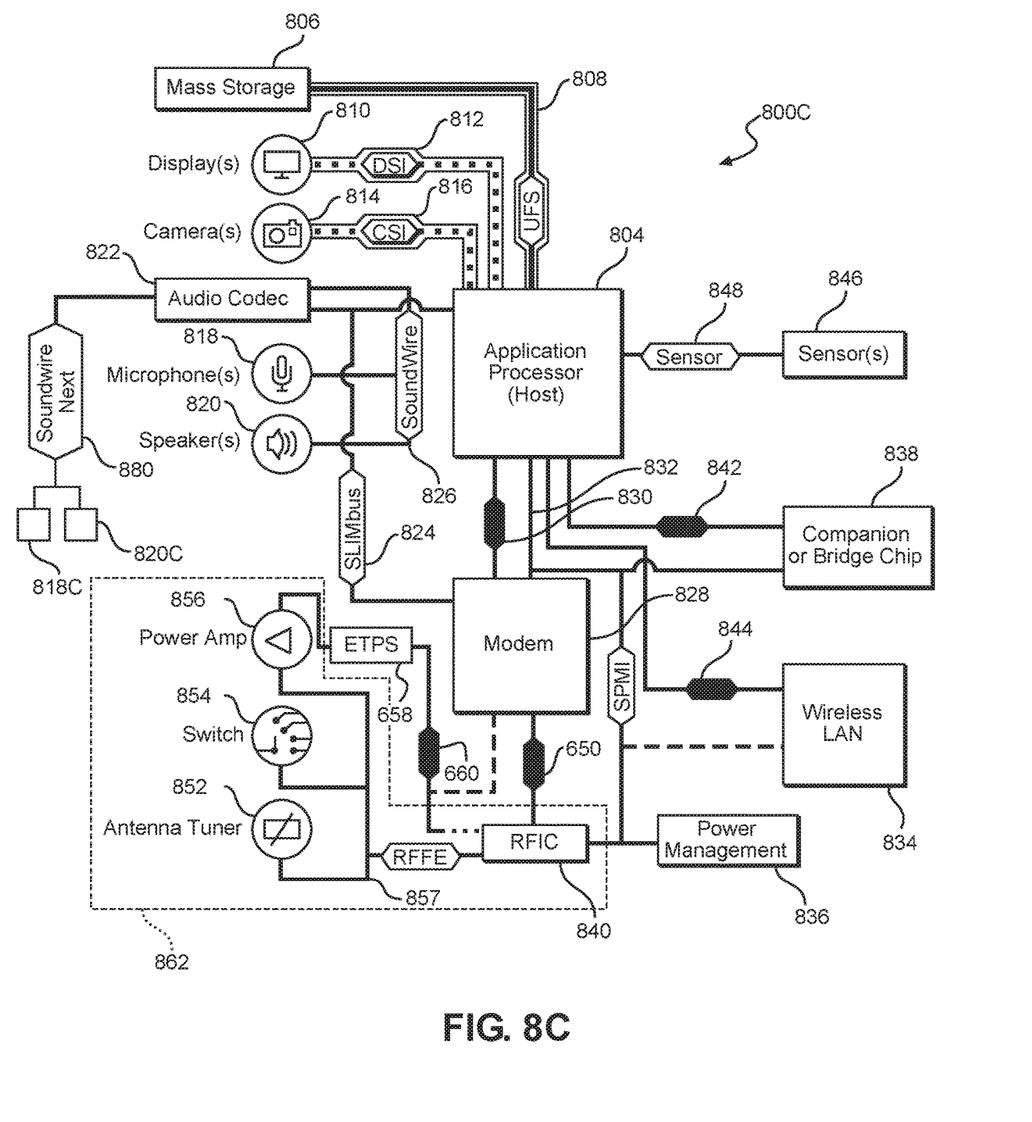
FIG. 8C is a system-level block diagram of another alternate exemplary mobile terminal that can include the audio system of FIG. 1 or 4.

Exemplary aspects of the present disclosure are well suited for use with a SOUNDWIRE NEXT bus. There are a variety of locations in a computing device at which a SOUNDWIRE NEXT bus may be placed. In this regard, FIGS. 8A-8C illustrate various placements. In most instances, the overall architecture is the same. In this regard, FIG. 8A is system-level block diagram of an exemplary mobile terminal 800 such as a smart phone, mobile computing device tablet, or the like. While a mobile terminal is particularly contemplated as being capable of benefiting from exemplary aspects of the present disclosure, it should be appreciated that the present disclosure is not so limited and may be useful in any system having a multi-drop differential bus without satisfactory wake-up and bus reset processes. For the sake of illustration, it is assumed that a SOUNDWIRE NEXT bus 826, which may be the bus 102, within the mobile terminal 800 is among multiple communication buses configured to use the in-band reset and wake-up processes on a differential audio bus according to the present disclosure.

With continued reference to FIG. 8A, the mobile terminal 800 includes an application processor 804 (sometimes referred to as a host) that communicates with a mass storage element 806 through a universal flash storage (UFS) bus 808. The application processor 804 may further be connected to a display 810 through a display serial interface (DSI) bus 812 and a camera 814 through a camera serial interface (CSI) bus 816. Various audio elements such as a microphone 818, a speaker 820, and an audio codec 822 may be coupled to the application processor 804 through a serial low power interchip multimedia bus (SLIMbus) 824. Additionally, the audio elements may communicate with each other and the audio codec 822 through the SOUNDWIRE NEXT bus 826. A modem 828 may also be coupled to the SLIMbus 824. The modem 828 may further be connected to the application processor 804 through a peripheral component interconnect (PCI) or PCI express (PCIe) bus 830 and/or a system power management interface (SPMI) bus 832. Note that the SLIMbus 824 may be replaced by a SOUNDWIRE bus in some implementations.

With continued reference to FIG. 8A, the SPMI bus 832 may also be coupled to a wireless local area network (WLAN) integrated circuit (IC) (WLAN IC) 834, a power management integrated circuit (PMIC) 836, a companion integrated circuit (sometimes referred to as a bridge chip) 838, and a radio frequency integrated circuit (RFIC) 840. It should be appreciated that separate PCI buses 842 and 844 may also couple the application processor 804 to the companion integrated circuit 838 and the WLAN IC 834. The application processor 804 may further be connected to sensors 846 through a sensor bus 848. The modem 828 and the RFIC 840 may communicate using a bus 850.

With continued reference to FIG. 8A, the RFIC 840 may couple to one or more radio frequency front end (RFFE) elements, such as an antenna tuner 852, a switch 854, and a power amplifier 856 through an RFFE bus 857. Additionally, the RFIC 840 may couple to an envelope tracking power supply (ETPS) 858 through a bus 860, and the ETPS 858 may communicate with the power amplifier 856. Collectively, the RFFE elements, including the RFIC 840, may be considered an RFFE system 862. It should be appreciated that the RFFE bus 857 may be formed from a clock line and a data line (not illustrated).

FIG. 8B illustrates an alternate placement of the SOUNDWIRE NEXT bus. While the majority of the elements are the same as the mobile terminal 800, the mobile terminal 800B illustrated in FIG. 8B has a SOUNDWIRE bus 826B coupling the audio codec 822 to the microphone(s) 818 and the speaker(s) 820. The application processor 804 may be coupled to a SOUNDWIRE NEXT bus 870 that may couple to an optional bridge 872. If the bridge 872 is present, then the bus 874 may be a SOUNDWIRE bus. If the bridge 872 is not present, then the SOUNDWIRE NEXT bus 870 may couple directly to microphones 818B, speakers 820B, and/or an audio codec 822B.

Similarly, FIG. 8C illustrates another alternate placement of the SOUNDWIRE NEXT bus. In the mobile terminal 800C, the audio codec 822 may couple to a SOUNDWIRE bus 826C and a SOUNDWIRE NEXT bus 880. The SOUNDWIRE NEXT bus 880 may couple to microphones 818C and speakers 820C.

Figure 9:
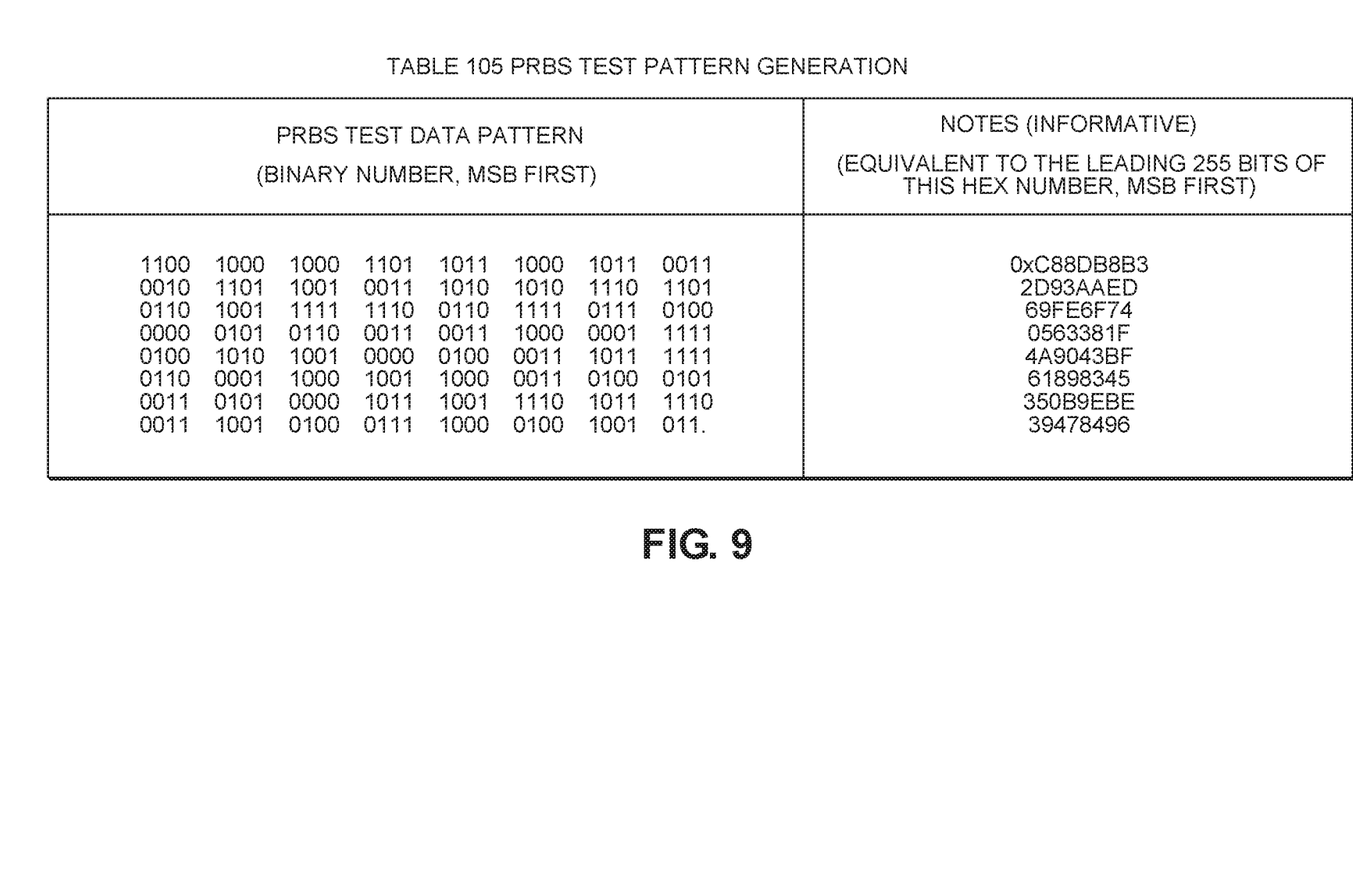
FIG. 9 is a table from the SOUNDWIRE specification showing a predefined pseudo-random binary sequence (PRBS) used in an exemplary scrambling and descrambling of the present disclosure.

It should be appreciated that the LFSR 518 of FIG. 5 and the LFSR 618 of FIG. 6 may have the same PRBS stored therein. In an exemplary aspect, the PRBS is the PRBS defined by the SOUNDWIRE specification as illustrated by Table 105 of the specification and reproduced as FIG. 9.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An audio system comprising:
   an audio bus;
   an audio sink coupled to the audio bus;
   an audio source comprising:
      an audio bus interface comprising a first data port and a second data port coupled to the audio bus,
      wherein the first data port comprises:
         a first linear feedback shift register (LFSR);
         a first offset circuit coupled to the first LFSR configured to provide a first offset signal to the first LFSR; and
         a first exclusive OR (XOR) circuit coupled to the first LFSR to scramble a first stream of data received by the first data port with an output of the first LFSR, wherein the output of the first LFSR comprises a pseudo-random binary sequence (PRBS), and
      wherein the second data port comprises:
         a second LFSR;
         a second offset circuit coupled to the second LFSR configured to provide a second offset signal to the second LFSR; and
         a second XOR circuit coupled to the second LFSR to scramble a second stream of data received by the second data port with an output of the second LFSR; and
   an application processor, wherein the application processor is configured to program the first and second offset circuits during a configuration process.

2. The audio system of claim 1, wherein the audio source is a microphone.

3. The audio system of claim 1, wherein the audio bus comprises a SOUNDWIRE or SOUNDWIRE NEXT audio bus.

4. The audio system of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

5. The audio system of claim 1, wherein the audio sink comprises an audio bus interface comprising a physical layer (PHY) coupled to the audio bus, and comprises a control system coupled to the audio bus interface, wherein the PHY comprises an LFSR coupled to an XOR circuit to descramble an incoming stream of data received from the audio bus.

\* \* \* \* \*